United States Patent
Falco et al.

(10) Patent No.: US 11,064,700 B2
(45) Date of Patent: *Jul. 20, 2021

(54) METHODS TO INCREASE CORN GROWTH

(71) Applicant: Valent BioSciences LLC, Libertyville, IL (US)

(72) Inventors: Kimberly Ann Falco, Crystal Lake, IL (US); Franklin Paul Silverman, Highland Park, IL (US); Dale O. Wilson, Jr., Round Lake Beach, IL (US); Derek D. Woolard, Zion, IL (US); Peter D. Petracek, Grayslake, IL (US)

(73) Assignee: VALENT BIOSCIENCES LLC, Libertyville, IL (US)

( * ) Notice: Subject to any disclaimer, the term of this patent is extended or adjusted under 35 U.S.C. 154(b) by 147 days.

This patent is subject to a terminal disclaimer.

(21) Appl. No.: 16/367,603

(22) Filed: Mar. 28, 2019

(65) Prior Publication Data
US 2019/0223443 A1 Jul. 25, 2019

Related U.S. Application Data

(63) Continuation-in-part of application No. 15/060,748, filed on Mar. 4, 2016, now abandoned.

(60) Provisional application No. 62/128,240, filed on Mar. 4, 2015.

(51) Int. Cl.
*A01N 45/00* (2006.01)
*A01N 37/42* (2006.01)
*A01N 25/00* (2006.01)

(52) U.S. Cl.
CPC ............. *A01N 45/00* (2013.01); *A01N 25/00* (2013.01); *A01N 37/42* (2013.01)

(58) Field of Classification Search
CPC ......... A01N 45/00; A01N 25/00; A01N 37/42
See application file for complete search history.

(56) References Cited

U.S. PATENT DOCUMENTS

| | | | | |
|---|---|---|---|---|
| 6,984,609 | B2 ‡ | 1/2006 | Devisetty | A01N 25/12 504/11 |
| 10,058,097 | B2 * | 8/2018 | Silverman | A01N 37/42 |
| 2005/0197253 | A1 ‡ | 9/2005 | Stoller | A01N 43/38 504/13 |
| 2008/0318783 | A1 ‡ | 12/2008 | Wilson, Jr. | A01N 37/42 504/136 |
| 2013/0053244 | A1 ‡ | 2/2013 | Devisetty | A01N 37/42 504/13 |
| 2014/0213454 | A1 * | 7/2014 | Kaiser | A01N 45/00 504/140 |
| 2016/0255834 | A1 * | 9/2016 | Falco | A01N 37/06 |

FOREIGN PATENT DOCUMENTS

| | | | | |
|---|---|---|---|---|
| CN | 102701861 A | * | 10/2012 | |
| CN | 102701861 A | ‡ | 10/2012 | |
| WO | WO-2013065876 A1 | * | 5/2013 | A01H 3/04 |

OTHER PUBLICATIONS

CN 102701861, Plant Nutrient Liquid Fertilizer, Oct. 3, 2012, Machine Translation, Patent Translate Powered by EPO and Google, 16 pages. (Year: 2012).*
Confined Field Trial of Drought-tolerant Maize Yields Promising Results, [online], CIMMYT, 2013 [retrieved on Oct. 7, 2020], Retrieved from the Internet:<https://www.cimmyt.org/news/confined-field-trial-of-drought-tolerant-maize-yields-promising-results/>, pp. 1-5. (Year: 2013).*
Stojakovic, M., B73 and Related Inbred Lines in Maize Breeding, 2005, Genetika, vol. 37, No. 3, pp. 245-252. (Year: 2005).*
International Search Report and Written Opinion dated May 20, 2016 in corresponding PCT Application No. PCT/US2016/020824.‡
White et al., "Gibberellins and seed development in maize. I. Evidence that gibberellin/abscisic acid balance governs germination versus maturation pathways", Plant Physiology, Apr. 2000, vol. 102, pp. 1081-1088, pp. 1081-1088.‡
Abendroth et al., "Corn growth and development" Iowa State university Extension and Outreach, Mar. 2011, pp. 1-49.‡
CN102701861, Plant Nutrient Liquid Fertilizer, Oct. 3, 2012, Machine Translation, pp. 1-16.‡

\* cited by examiner
‡ imported from a related application

*Primary Examiner* — Sue X Liu
*Assistant Examiner* — Andriae M Holt
(74) *Attorney, Agent, or Firm* — Wood, Phillips, Katz, Clark & Mortimer

(57) ABSTRACT

The present invention is directed to methods for improving corn growth comprising applying an effective amount of gibberellic acid and abscisic acid to the corn plant, wherein the weight ratio of $GA_3$:ABA is from about 10:1 to about 14:1.

14 Claims, No Drawings

METHODS TO INCREASE CORN GROWTH

FIELD OF THE INVENTION

The present invention is generally directed to methods for improving corn growth comprising applying an effective amount of gibberellic acid ("$GA_3$") and abscisic acid ("ABA") to the corn plant, wherein the weight ratio of $GA_3$:ABA is from about 10:1 to about 14:1.

BACKGROUND OF THE INVENTION

Growers continually attempt to grow the most productive corn plants possible in order to maximize yields. Plant growth regulators are one tool that growers can use in order to influence the growth of their plants based on the restrictions of water and temperature. The effects of plant growth regulators on plants under different conditions can vary widely. Further, predicting the effect that application of more than one plant growth regulator simultaneously applied to the plant is difficult.

$GA_3$ is an endogenous corn plant growth regulator that has many roles in growth and development. For example, $GA_3$ stimulates the aleurone cells of germinating grains to produce lytic enzymes that mobilize starch reserves and stimulate the growth of the embryo, causing seed germination. Application of $GA_3$ to vegetative phase corn increases the plants' height; however, an excessive doss can make the corn overly tall, resulting in green snap (of stalks) or lodging. Examples of effective commercially available gibberellic acid formulations include ProGibb® 40% and RyzUp SmartGrass® (both available from Valent BioSciences Corporation, ProGibb and RyzUp SmartGrass are registered trademarks of Valent BioSciences Corporation).

ABA is another endogenous corn plant growth regulator. ABA increases plants' resistance to abiotic stress. If the dose of ABA is too high, reduction of plant growth can occur and this is not always acceptable due to adverse side effects and the negative effects on yield. On the other hand, if the dose is too low, the duration of the ABA effect may be too short.

In general, $GA_3$ and ABA are most commonly considered to be phyto-hormonal antagonists, meaning that both the positive and negative regulatory aspects of each hormone's action are generally the opposite of the other's. In corn, $GA_3$ and ABA are known to act antagonistically in seed maturation and germination pathways. ABA suppresses precocious germination and induces the expression of genes associated with maturation, for example, genes that control the development of desiccation tolerance and the accumulation of storage products. When seed kernels are deficient in ABA, they become viviparous, actually germinating on the ear during the course of kernel development. However, while precocious germination is suppressed by ABA, its mere absence is not sufficient for germination in immature maize embryos. Instead, $GA_3$ plays a positive role in precocious germination, and the ratio of GA to ABA mediates the decision whether to enter the maturation or germination pathways (see White, et al., 2000 Plant Physiol. 122:1081).

U.S. Pat. No. 6,984,609 is directed to water-soluble gibberellin compositions that can include an additional plant growth regulator. This patent, however, fails to disclose the ratios of $GA_3$ and ABA of the present invention being applied to corn.

US Patent Application Publication No. 2014/0213454 is directed to methods for inducing drought tolerance in crops such as cereal grains by application of at least one gibberellin to the crops. This application, however, also fails to disclose the ratios of $GA_3$ and ABA of the present invention being applied to corn.

Accordingly, there is a need for new methods to improve the growth of corn under non-stressed and stressed conditions.

SUMMARY OF THE INVENTION

In one aspect, the present invention is directed to methods for corn growth comprising applying a ratio of from about 10:1 to about 14:1 of $GA_3$ and ABA to the corn plant.

In another aspect, the present invention is directed to a method of improving hybrid corn plant growth comprising applying an effective amount of gibberellic acid ($GA_3$) and abscisic acid (ABA) to the hybrid corn plant during the hybrid corn stage period beginning at V4 and ending at V6, wherein the weight ratio of GA3:ABA is about 12.8:1.

In another aspect, the present invention is directed to a method of improving hybrid corn plant growth comprising applying an effective amount of gibberellic acid ($GA_3$) and abscisic acid (ABA) to the hybrid corn plant, wherein the weight ratio of $GA_3$:ABA is from about 10:1 to about 14:1, wherein the hybrid corn plant is an offspring of a B73 parent.

DETAILED DESCRIPTION OF THE INVENTION

Applicant unexpectedly discovered that a ratio of 12.8:1 of $GA_3$:ABA resulted in increased growth and yield in corn. Applicant also unexpectedly discovered that a ratio of 10:1 to 14:1 of $GA_3$:ABA resulted in better than expected increase in growth in corn.

In one embodiment, the present invention is directed to methods for improving corn growth comprising applying an effective amount of $GA_3$ and ABA to the corn plant, wherein the weight ratio of $GA_3$:ABA is from about 10:1 to about 14:1.

In a preferred embodiment, the weight ratio of $GA_3$:ABA is from about 12:1 to about 14:1, more preferably from about 12.5:1 to about 13.1:1. In a more preferred embodiment, the weight ratio of $GA_3$:ABA is about 12.8:1.

In the present invention, the corn may be inbred or hybrid. In a preferred embodiment, the corn is an inbred variety. In another embodiment, the corn is a hybrid variety. In a preferred embodiment, the hybrid is selected from the group consisting of a northern corn belt variety with a 100 day maturity and a central corn belt variety with a 111 day maturity. In another embodiment, the hybrid is the offspring of a B73 variety parent.

In another embodiment, the corn is genetically modified. In a preferred embodiment, the genetically modified corn expresses herbicide resistance, insect resistance, drought tolerance or increased physiological function.

In another embodiment, the corn is subjected to drought stress. As used herein, drought stress refers to conditions wherein the plant has insufficient water resources to support optimal growth and development.

In a preferred embodiment, the $GA_3$ and ABA are applied during the corn growth stage period beginning at V2 and ending at V6. In a more preferred embodiment, the $GA_3$ and ABA are applied during the corn growth stage period beginning at V3 and ending at V6. Applicant has referred to corn developmental stages throughout the application as "V" stages. The "V" stages are designated numerically as V1, V2, V3, etc. In this identification system of V(n), (n) represents the number of leaves with visible collars. Each leaf stage is defined according to the uppermost leaf whose leaf collar is visible (see Corn Growth and Development, 2011. Abendroth, L, Elmore, R, Boyer, M and Marlay, S, Iowa State University Press). "VT" refers to tassel emergence growth stage and is not an early vegetative stage of corn.

In another embodiment, from about 6 to about 21 grams of $GA_3$ per hectare are applied to the corn. In a preferred embodiment, from about 12 to about 14 grams of $GA_3$ per hectare are applied to the corn.

In yet another embodiment, from about 0.5 to 1.5 grams of ABA per hectare are applied to the corn. In a more preferred embodiment, 1 gram of ABA per hectare is applied to the corn.

In a preferred embodiment, the increased corn growth results in increased corn yield.

In another embodiment, the $GA_3$ and ABA can be applied with an herbicide such as glyphosate, mesotrione, halosulfuron, saflufenacil or dicamba.

In an embodiment, the $GA_3$ and ABA can be applied with a fungicide such as tetraconazole, metconazole, a strobilurin, or a combined strobilurin-azole product.

In an embodiment, the $GA_3$ and ABA can be applied with an insecticide such as methylparathion, bifenthryn, esfenvalerate, lorsban, carbaryl or lannate.

In yet another embodiment, the $GA_3$ and ABA can be applied with foliar fertilizers such as CoRoN (available from Helena Chemical), a controlled-release nitrogen, or Bio-Forge (available from Stoller USA), which is largely N,N'-diformyl urea, or other micro nutrient-containing sprays.

The $GA_3$ and ABA can be applied by any convenient means. Those skilled in the art are familiar with the modes of application that include foliar applications such as spraying, dusting, and granular applications; soil applications including spraying, in-furrow treatments, or side-dressing.

Aqueous spray solutions utilized in the present invention generally contain from about 0.01% to about 0.5% (v/v) of a surface-active agent.

The surface active agent comprises at least one non-ionic surfactant. In general, the non-ionic surfactant may be any known non-ionic surfactant in the art. Suitable non-ionic surfactants are in general oligomers and polymers. Suitable polymers include alkyleneoxide random and block copolymers such as ethylene oxide-propylene oxide block copolymers (EO/PO block copolymers), including both EO-PO-EO and PO-EO-PO block copolymers; ethylene oxide-butylene oxide random and block copolymers, C2-6 alkyl adducts of ethylene oxide-propylene oxide random and block copolymers, C2-6 alkyl adducts of ethylene oxide-butylene oxide random and block copolymers, polyoxyethylene-polyoxypropylene monoalkylethers, such as methyl ether, ethyl ether, propyl ether, butyl ether or mixtures thereof; vinylacetate/vinylpyrrolidone copolymers; alkylated vinylpyrrolidone copolymers; polyvinylpyrrolidone; and polyalkyleneglycol, including the polypropylene glycols and polyethylene glycols. Other non-ionic agents are the lecithins; and silicone surface active agents (water soluble or dispersible surface active agents having a skeleton which comprises a siloxane chain e.g. Silwet L77®). A suitable mixture in mineral oil is ATPLUS 411 F®.

As used herein, "effective amount" refers to the amount of the $GA_3$ and/or ABA that will improve growth, drought stress tolerance, chilling stress tolerance, and/or yield. The "effective amount" will vary depending on the $GA_3$ and ABA concentration, the corn variety being treated, the severity of the stress, the result desired, and the life stage of the plants, among other factors. Thus, it is not always possible to specify an exact "effective amount." However, an appropriate "effective amount" in any individual case may be determined by one of ordinary skill in the art.

As used herein, "improving" means that the corn has more of the quality than the corn would have had it if it had not been treated by methods of the present invention.

The disclosed embodiments are simply exemplary embodiments of the inventive concepts disclosed herein and should not be considered as limiting, unless the claims expressly state otherwise.

As used herein, all numerical values relating to amounts, weight percentages and the like are defined as "about" or "approximately" each particular value, namely, plus or minus 10% (±10%). For example, the phrase "at least 5% by weight" is to be understood as "at least 4.5% to 5.5% by weight." Therefore, amounts within 10% of the claimed values are encompassed by the scope of the claims.

The articles "a," "an" and "the" are intended to include the plural as well as the singular, unless the context clearly indicates otherwise.

The following examples are intended to illustrate the present invention and to teach one of ordinary skill in the art how to use the formulations of the invention. They are not intended to be limiting in any way.

EXAMPLES

Example 1

Hybrid corn was grown under conventional tillage in Chabás, Santa Fe, Argentina. At V2 growth stage, $GA_3$ or a combination of $GA_3$ and ABA was applied as a foliar treatment. Vigor was rated on a 1 to 9 scale (untreated=5.0) following spray applications at the times specified in Table 1.

TABLE 1

| Treatment | 3 d post-spraying | 7 d post-spraying | 15 d post-spraying |
|---|---|---|---|
| Untreated | 5.0 | 5.0 | 5.0 |
| $GA_3$, 8 g/ha | 5.2 | 5.3 | 5.5 |
| $GA_3$, 16 g/ha | 5.5 | 5.6 | 6.0 |
| $GA_3$(16 g) + ABA(0.625 g)/ha; Ratio 23.7:1 | 5.3 | 6.0 | 6.1 |
| $GA_3$(16 g) + ABA(1.25 g)/ha; Ratio 12.8:1 | 5.5 | 6.2 | 6.5 |

The 12.8:1 ratio of $GA_3$:ABA treatment showed the greatest vigor following spraying. The increased growth also resulted in an increase in final yields (see Table 2 below).

TABLE 2

| Treatment | Yield (kg/ha) |
|---|---|
| Untreated | 8096 |
| $GA_3$, 8 g/ha | 8355 |
| $GA_3$, 16 g/ha | 8769 |
| $GA_3$(16 g) + ABA(0.625 g)/ha; Ratio 23.7:1 | 8721 |
| $GA_3$(16 g) + ABA(0.1.25 g)/ha; Ratio 12.8:1 | 9289 |

Example 2

Three corn field trials were established in December 2014 in different locations in Argentina (Ferre, Uriquiza, and Venado Tuerto). The products RyzUp Smartgrass (40% GA3; Ratio 1:0) and RyzUp Duo (40% $GA_{3+3.12}$% s-ABA; Ratio 12.8:1) were foliar sprayed at V4 developmental stage at rates of 0, 20, and 40 g/ha (commercial product) with 150 L/ha spraying volume. Silwet surfactant was added to the spraying solution at 0.025% (v/v). Plot size was 4×15 m (60 m2). The field trials were harvested in May 2015 (Table 3). Yield data was analyzed as a split-plot RCBD with product as the main-treatment and rate as the sub-treatment. Due to the non-significant product x rate interaction, yield data was analyzed and shown by product and averaged across rates.

TABLE 3

Yield results in kg/ha adjusted to 14% grain moisture.

| Treatment | Location Ferre | Location Urquiza | Venado | Average across locations | % yield increase in relation to UTC |
|---|---|---|---|---|---|
| UTC | 9612.76 | 9196.7 | 10495.99 | 9768.48 | 0 |
| RUSG (20 and 40 g/ha): Ratio 1:0 | 10681.48 | 9366.7 | 10620.71 | 10222.95 | 4.7 |
| Duo (20 and 40 g/ha) Ratio 12.1:1 | 11110.26 | 9315.4 | 10930 | 10451.9 | 7.0 |

Example 3

In a corn trial under conventional tillage in Lozada, Argentina, hybrid corn was planted and sprayed at 16 days post-planting at the V3 growth stage. At harvest, the combination of $GA_3$ and ABA at the ratio of 12.8:1 had the highest yield, as is shown in Table 4.

TABLE 4

| Treatment | Yield (kg/ha) | Yield difference from control treatment |
|---|---|---|
| Untreated | 3840 | 0 |
| $GA_3$, 8 g/ha | 4210 | 370 |
| $GA_3$, 16 g/ha | 4185 | 345 |
| $GA_3$(16 g) + ABA(0.625 g)/ha; Ratio 23.7:1 | 4050 | 210 |
| $GA_3$(16 g) + ABA(0.1.25 g)/ha; Ratio 12.8:1 | 4415 | 575 |

As shown above, the 12.8:1 $GA_3$:ABA ratio provided greater yield.

Example 4

A field study was conducted at Woodstock, Ill. Seeds of two commercial varieties were sown: Hybrid 1 was northern corn belt variety with 100 days to maturity, while Hybrid 2 was a central corn belt variety with 111 days to maturity. Corn of these two varieties was sown into cool soil on May 7, 2014. Plants were sprayed at V2 with solutions containing a non-ionic surfactant (0.25%, v/v) at 15 gallons of spray solution/acre and growth was followed for 14 days. At seven days and 14 days after treatment shoot heights in centimeters were measured for 60 plants in each replicate.

TABLE 5

| Variety | $GA_3$:ABA Ratio | Days post treatment 7 | Days post treatment 14 |
|---|---|---|---|
| Hybrid 1 | 0:0 | 37.75 | 57.90 |
| Hybrid 1 | 1:0 | 36.07 | 57.08 |
| Hybrid 1 | 12.8:1 | 36.08 | 57.11 |
| Hybrid 2 | 0:0 | 29.56 | 50.16 |
| Hybrid 2 | 1:0 | 31.33 | 51.20 |
| Hybrid 2 | 12.8:1 | 32.43 | 52.51 |

The results observed for the two varieties differed at this planting date; Hybrid 1 did not respond to either $GA_3$ or the combination of $GA_3$ and ABA. However, plants of Hybrid 2 did respond to the spray treatments, with growth increased by $GA_3$, but more so by $GA_3$ and ABA at the 12.8:1 ratio. The difference in response between the two hybrids could be due to their differences in days until maturity and the location of the study.

Example 5

This study was conducted and the data analyzed as described above in Example 3 with the following the exceptions. The plants were sprayed at the V4 stage and plant height was measured at seven and 13 days post treatment.

TABLE 6

| Variety | $GA_3$:ABA Ratio | 7 days post treatment | 13 days post treatment |
|---|---|---|---|
| Hybrid 1 | 0:0 | 76.50 | 117.61 |
| Hybrid 1 | 1:0 | 78.60 | 116.44 |
| Hybrid 1 | 12.8:1 | 82.66 | 123.16 |
| Hybrid 2 | 0:0 | 63.76 | 98.71 |
| Hybrid 2 | 1:0 | 68.25 | 102.40 |
| Hybrid 2 | 12.8:1 | 73.41 | 107.24 |

The greatest increase in growth was observed with the 12.8:1 of $GA_3$:ABA.

Example 6

In this example, seeds of three varieties were sown at Long Grove, Ill. and were grown under similar conditions as in Examples 3 to 6. Three hybrid corn varieties were grown, Hybrid 1 and 2 as above, and Hybrid 3 which was another central corn belt variety requiring 111 days to maturity.

At the early V-stages, the growing point of the corn stem is below the soil surface and emerges from the soil when the plants are at V5 or later, depending on the variety. In spring, the soil is generally cooler than the air temperature. Therefore, there would be an advantage to getting the growing point above the soil surface to facilitate faster growth.

The plants were sprayed at the V4 growth stage. Plants were dug from the ground at days after spray. Stems of five plants per replicate, three replicates per treatment were split and the distance of the growing point relative to the soil surface was determined in mm.

TABLE 7

| Variety | GA₃:ABA Ratio | Days post treatment | | | |
|---|---|---|---|---|---|
| | | 4 | 7 | 13 | 20 |
| Hybrid 1 | 0:0 | −1.13 | 17.47 | 166.40 | 644.00 |
| Hybrid 1 | 1:0 | 4.20 | 34.53 | 163.27 | 603.80 |
| Hybrid 1 | 12.8:1 | 7.07 | 32.67 | 185.60 | 699.80 |
| Hybrid 2 | 0:0 | 0.80 | 18.80 | 128.87 | 517.13 |
| Hybrid 2 | 1:0 | 1.87 | 24.07 | 130.93 | 515.53 |
| Hybrid 2 | 12.8:1 | 2.33 | 26.40 | 143.13 | 473.87 |
| Hybrid 3 | 0:0 | 0.53 | 25.60 | 147.73 | 619.33 |
| Hybrid 3 | 1:0 | 3.67 | 27.87 | 164.67 | 653.53 |
| Hybrid 3 | 12.8:1 | 7.33 | 30.27 | 167.20 | 576.60 |

The 12.8:1 ratio of $GA_3$:ABA provided increased growth in all varieties for at least 13 days.

Example 7

A greenhouse study was conducted at Long Grove, Ill. Seeds of the corn hybrid B73 X Mo17 was sown into potted soil on May 7, 2014. Plants were sprayed at 11 days post sowing (V1-V2) with solutions containing a non-ionic surfactant (0.25%, v/v) and growth was followed for 6 days. $GA_3$ refers to gibberellic acid and ABA refers to abscisic acid. Results of the study described in 3. above can be seen in the following tables describing change in height in centimeters from day of treatment (Table 8) and change in height in centimeters from day of treatment compared to control (Table 9).

TABLE 8

| GA₃:ABA Ratio | GA₃ (ppm) | ABA (ppm) | Days post treatment | | |
|---|---|---|---|---|---|
| | | | 2 | 4 | 6 |
| 0:0 | 0 | 0 | 9.74 | 22.59 | 43.03 |
| 1:0 | 120 | 0 | 12.87 | 27.56 | 50.24 |
| 0:1 | 0 | 12 | 10.49 | 22.10 | 43.03 |
| 0:1 | 0 | 10 | 9.63 | 22.44 | 42.70 |
| 0:1 | 0 | 8.6 | 9.57 | 21.87 | 41.66 |
| 10:1 | 120 | 12 | 13.71 | 27.79 | 51.09 |
| 12:1 | 120 | 10 | 13.83 | 27.83 | 50.86 |
| 14:1 | 120 | 8.6 | 11.94 | 26.94 | 49.89 |

TABLE 9

| GA₃:ABA Ratio | GA₃ (ppm) | ABA (ppm) | Days post treatment Observed | | | Days post treatment Expected | | | Days post treatment Synergy Factor | | |
|---|---|---|---|---|---|---|---|---|---|---|---|
| | | | 2 | 4 | 6 | 2 | 4 | 6 | 2 | 4 | 6 |
| 1:0 | 120 | 0 | 3.13 | 4.97 | 7.21 | n/a | n/a | n/a | n/a | n/a | n/a |
| 0:1 | 0 | 12 | 0.75 | −0.49 | 0 | n/a | n/a | n/a | n/a | n/a | n/a |
| 0:1 | 0 | 10 | −0.11 | −0.15 | −0.33 | n/a | n/a | n/a | n/a | n/a | n/a |
| 0:1 | 0 | 8.6 | −0.17 | −0.72 | −1.37 | n/a | n/a | n/a | n/a | n/a | n/a |
| 10:1 | 120 | 12 | 3.97 | 5.2 | 8.06 | 3.88 | 4.48 | 7.21 | 1.02 | 1.16 | 1.12 |
| 12:1 | 120 | 10 | 4.09 | 5.24 | 7.83 | 3.02 | 4.82 | 6.88 | 1.35 | 1.09 | 1.14 |
| 14:1 | 120 | 8.6 | 2.2 | 4.35 | 6.86 | 2.96 | 4.25 | 5.84 | 0.74 | 1.02 | 1.17 |

Synergy is calculated as follows:
Observed difference in height from control/Expected difference in height from control, where expected difference in height from control is the sum of the observed difference in height of each active ingredient applied alone. If the ratio between the experimentally observed efficacy of the mixture and the expected efficacy of the mixture is greater than 1, than synergistic interactions are present in the mixture.

As can be seen in Tables 8 and 9, above, the application of $GA_3$ alone increased the height of the corn compared to the control. The application of ABA alone either did not increase or decreased the height of the corn compared to the control at both 4 and 6 days post treatment. Further, the co-application of $GA_3$ and ABA in a ratio of 12:1 or 10:1 synergistically increased the height of corn compared to control height at all days tested. Finally, the co-application of $GA_3$ and ABA in a ratio of 14:1 synergistically increased the height of corn compared to control height at both 4 and 6 days post treatment.

Example 8

A field study was conducted at Woodstock, Ill. Seeds of two commercial varieties were sown: Hybrid 1 was northern corn belt variety with 100 days to maturity, while Hybrid 2 was a central corn belt variety with 111 days to maturity. Corn of these two varieties was sown into cool soil on May 7, 2014. Plants were sprayed at V2 with solutions containing a non-ionic surfactant (0.25%, v/v) at 15 gallons of spray solution/acre and growth was followed for 14 days. $GA_3$ refers to gibberellic acid and ABA refers to abscisic acid. Results of the study are found in Table 10 below describing shoot height in centimeters.

TABLE 10

| Variety | GA₃:ABA Ratio | Days post treatment | |
|---|---|---|---|
| | | 7 | 14 |
| Hybrid 1 | 0:0 | 37.75 | 57.90 |
| Hybrid 1 | 1:0 | 36.07 | 57.08 |
| Hybrid 1 | 12.8:1 | 36.08 | 57.11 |
| Hybrid 2 | 0:0 | 29.56 | 50.16 |
| Hybrid 2 | 1:0 | 31.33 | 51.20 |
| Hybrid 2 | 12.8:1 | 32.43 | 52.51 |

Example 9

Another study was conducted and the data analyzed as described Example 8, above, with the following the exceptions. The plants were sprayed at the V4 stage and plant height was measured at seven and 13 days post treatment. Results of this study are found in Table 11, below, describing shoot height in centimeters.

TABLE 11

| Variety | GA$_3$:ABA Ratio | 7 days post treatment | 13 days post treatment |
|---|---|---|---|
| Hybrid 1 | 0:0 | 76.50 | 117.61 |
| Hybrid 1 | 1:0 | 78.60 | 116.44 |
| Hybrid 1 | 12.8:1 | 82.66 | 123.16 |
| Hybrid 2 | 0:0 | 63.76 | 98.71 |
| Hybrid 2 | 1:0 | 68.25 | 102.40 |
| Hybrid 2 | 12.8:1 | 73.41 | 107.24 |

Example 10

Seeds of three varieties were sown at Long Grove, Ill. and were grown under similar conditions as in Example 8, above. Three hybrid corn varieties were grown, Hybrid 1 and 2 as described in Examples 8 and 9, above, and Hybrid 3 which was another central corn belt variety requiring 111 days to maturity. The plants were sprayed at the V4 growth stage. Plants were dug from the ground at days after spray. Stems of five plants per replicate, three replicates per treatment were split and the distance of the growing point relative to the soil surface was determined in mm. Results of this study are found in Table 12, below, describing distance of growing point relative to soil surface in millimeters.

TABLE 12

| Variety | GA$_3$:ABA Ratio | Days post treatment | | | |
|---|---|---|---|---|---|
| | | 4 | 7 | 13 | 20 |
| Hybrid 1 | 0:0 | −1.13 | 17.47 | 166.40 | 644.00 |
| Hybrid 1 | 1:0 | 4.20 | 34.53 | 163.27 | 603.80 |
| Hybrid 1 | 12.8:1 | 7.07 | 32.67 | 185.60 | 699.80 |
| Hybrid 2 | 0:0 | 0.80 | 18.80 | 128.87 | 517.13 |
| Hybrid 2 | 1:0 | 1.87 | 24.07 | 130.93 | 515.53 |
| Hybrid 2 | 12.8:1 | 2.33 | 26.40 | 143.13 | 473.87 |
| Hybrid 3 | 0:0 | 0.53 | 25.60 | 147.73 | 619.33 |
| Hybrid 3 | 1:0 | 3.67 | 27.87 | 164.67 | 653.53 |
| Hybrid 3 | 12.8:1 | 7.33 | 30.27 | 167.20 | 576.60 |

The term Hybrid 1 of Examples 8-10, above, refers to the same hybrid corn variety. As can be seen in the Table 10, above, the application of GA$_3$ and ABA in a 12.8:1 ratio did not increase shoot height in Hybrid 1 corn over control. However, this lack of response to application of 12.8:1 GA$_3$:ABA in Hybrid 1 corn is an aberration. Evidence of this aberration can be seen in the Tables 11 and 12, above, that demonstrate the application of 12.8:1 GA$_3$:ABA increased plant height and distance from soil to growing point, respectively, over control.

The invention claimed is:

1. A method of improving corn growth comprising applying an effective amount of gibberellic acid (GA$_3$) and abscisic acid (ABA) to the corn plant, wherein the weight ratio of GA$_3$:ABA is from about 9.3:1 to about 14:1.

2. The method of claim 1, wherein the weight ratio of GA$_3$:ABA is from about 12:1 to about 14:1.

3. The method of claim 1, wherein the weight ratio of GA$_3$:ABA is about 12.8:1.

4. The method of claim 1, wherein the corn is genetically modified.

5. The method of claim 4, wherein the genetically modified corn expresses herbicide resistance, insect resistance, drought tolerance or increased physiological function.

6. The method of claim 1, wherein the GA$_3$ and ABA are applied during the corn growth stage period beginning at V2 and ending at V6.

7. The method of claim 1, wherein from about 6 to about 21 grams of GA$_3$ per hectare are applied to the corn.

8. The method of claim 1, wherein from about 12 to about 14 grams of GA$_3$ per hectare are applied to the corn.

9. The method of claim 1, wherein from about 0.5 to about 1.5 grams of ABA per hectare are applied to the corn.

10. The method of claim 1, wherein about 1 gram of ABA per hectare is applied to the corn.

11. The method of claim 1, wherein the increased corn growth results in increased corn yield.

12. A method of improving hybrid corn plant growth comprising applying an effective amount of gibberellic acid (GA$_3$) and abscisic acid (ABA) to the hybrid corn plant during the hybrid corn stage period beginning at V4 and ending at V6, wherein the weight ratio of (GA$_3$):ABA is about 12.8:1.

13. A method of improving hybrid corn plant growth comprising applying an effective amount of gibberellic acid (GA$_3$) and abscisic acid (ABA) to the hybrid corn plant, wherein the weight ratio of GA$_3$:ABA is from about 9.3:1 to about 14:1.

14. The method of claim 13, wherein the weight ratio of GA$_3$:ABA is from about 12:1 to about 14:1.

* * * * *